United States Patent
Hanke

(10) Patent No.: US 9,262,460 B2
(45) Date of Patent: Feb. 16, 2016

(54) METHOD FOR ENTERING IDENTIFICATION DATA OF A VEHICLE INTO A USER DATABASE OF AN INTERNET SERVER DEVICE

(71) Applicant: AUDI AG, Ingolstadt (DE)

(72) Inventor: Alexander Hanke, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/410,523

(22) PCT Filed: Dec. 19, 2012

(86) PCT No.: PCT/EP2012/005245
§ 371 (c)(1),
(2) Date: Dec. 22, 2014

(87) PCT Pub. No.: WO2013/189510
PCT Pub. Date: Dec. 27, 2013

(65) Prior Publication Data
US 2015/0339334 A1 Nov. 26, 2015

(30) Foreign Application Priority Data

Jun. 23, 2012 (DE) .......................... 10 2012 012 565

(51) Int. Cl.
*G06F 17/00* (2006.01)
*G06F 17/30* (2006.01)
(Continued)

(52) U.S. Cl.
CPC .... *G06F 17/30339* (2013.01); *G06F 17/30879* (2013.01); *H04L 63/08* (2013.01); *H04L 67/10* (2013.01); *H04L 67/12* (2013.01); *H04L 67/141* (2013.01)

(58) Field of Classification Search
CPC .................... G06F 17/30339; G06F 17/30879; H04L 67/141; H04L 63/08; H04L 67/10; H04L 67/12

USPC .............. 701/1; 137/413, 538, 592, 625; 705/26.3; 707/748
See application file for complete search history.

(56) References Cited

U.S. PATENT DOCUMENTS

| 2002/0190128 A1 | 12/2002 | Levine et al. |
| 2003/0034900 A1 | 2/2003 | Han |

(Continued)

FOREIGN PATENT DOCUMENTS

| DE | 101 07 263 | 8/2002 |
| DE | 102008017946 | 11/2009 |

(Continued)

OTHER PUBLICATIONS

Yudhahutama et al., Network and Application Design for Children Tracking and Identification System with HTML5 and Asynchronous Communication Future Kindergarten Project, 2013, IEEE, p. 1-6.*

(Continued)

*Primary Examiner* — McDieunel Marc
(74) *Attorney, Agent, or Firm* — Henry M. Feiereisen LLC

(57) ABSTRACT

A method for entering identification data of a vehicle into a user database of an Internet server includes the steps of: establishing a network connection via the Internet to the server and authenticating a user at an internet portal of the server and transmitting the identification data (VIN) via the network connection to the server, and storing the identification data (VIN) as part of user data of the user in the user database by the server. The aim is to make determination of the identification data easier for the user. For that purpose, the network connection is established by a mobile communication device, which is additionally connected to the vehicle by a transmission device for transmission of data, and the identification data (VIN) is received from the vehicle by the communication device via the data transmission device.

14 Claims, 1 Drawing Sheet

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 2006/0242027 | A1* | 10/2006 | Falic | G06Q 30/02 705/26.81 |
| 2009/0222329 | A1* | 9/2009 | Ramer | G06F 17/30749 705/14.52 |
| 2009/0240586 | A1* | 9/2009 | Ramer | G06F 17/30905 705/14.64 |
| 2010/0063877 | A1* | 3/2010 | Soroca | G06F 17/30749 705/14.45 |
| 2010/0094878 | A1* | 4/2010 | Soroca | G06F 17/30035 707/748 |
| 2010/0211796 | A1* | 8/2010 | Gailey | G06F 21/31 713/182 |
| 2011/0029777 | A1 | 2/2011 | Murakami et al. | |
| 2011/0202471 | A1 | 8/2011 | Scott et al. | |
| 2011/0306326 | A1 | 12/2011 | Reed et al. | |
| 2012/0173358 | A1* | 7/2012 | Soroca | G06Q 30/08 705/26.3 |
| 2013/0132854 | A1* | 5/2013 | Raleigh | G06F 3/0482 715/738 |
| 2013/0254035 | A1* | 9/2013 | Ramer | G06Q 30/0256 705/14.62 |
| 2014/0063055 | A1* | 3/2014 | Osterhout | G06F 3/005 345/633 |
| 2014/0095300 | A1* | 4/2014 | Arshad | G06Q 30/0246 705/14.45 |
| 2014/0277654 | A1* | 9/2014 | Reinhardt | G09B 5/04 700/94 |
| 2015/0105631 | A1* | 4/2015 | Tran | A61B 5/0024 600/301 |

FOREIGN PATENT DOCUMENTS

| | | |
|---|---|---|
| DE | 102010055375 | 8/2011 |
| EP | 1 437 693 | 7/2004 |
| EP | 2 211 499 | 7/2010 |
| GB | 2 427 101 | 12/2006 |
| WO | WO 2010/020493 | 2/2010 |

OTHER PUBLICATIONS chipTAN comfort / SmartTAN optic (Flickering) [edit]—Wikipedia Jun. 13, 2012 https://de.wikipedia.org/w/index.php?title=Transaktionsnummer&oldid=104331740.

FAQ, Verkehrsverbund Oberelbe, Dec. 16, 2010 http://www.bahn.de/regional/view/mdb/pv/dbregio/ausfluege/sachsen/verkehrsverb__nde/2011/vvo_handyticket/MDB98982-vvo_handyticket_faq.pdf.

International Search Report issued by the European Patent Office in International Application PCT/EP2012/005245 on Apr. 18, 2013.

* cited by examiner

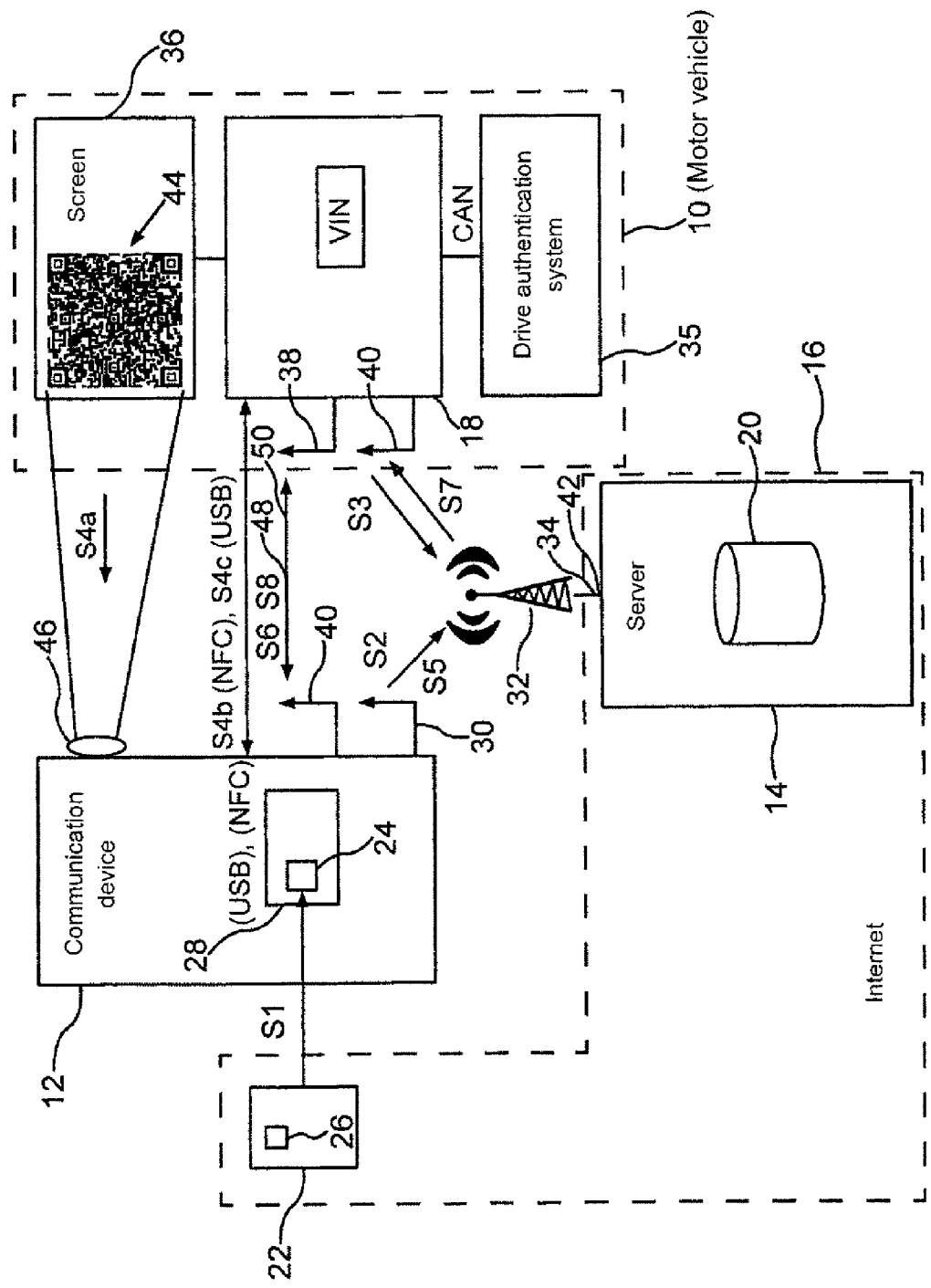

US 9,262,460 B2

METHOD FOR ENTERING IDENTIFICATION DATA OF A VEHICLE INTO A USER DATABASE OF AN INTERNET SERVER DEVICE

CROSS-REFERENCES TO RELATED APPLICATIONS

This application is the U.S. National Stage of International Application No. PCT/EP2012/005245, filed Dec. 19, 2012, which designated the United States and has been published as International Publication No. WO 2013/189510 A1 and which claims the priority of German Patent Application, Serial No. 10 2012 012 565.8, filed Jun. 23, 2012, pursuant to 35 U.S.C. 119(a)-(d).

BACKGROUND OF THE INVENTION

The invention relates to a method for entering identification data of a vehicle into a user database of an Internet server device. The invention also relates to a motor vehicle, a data carrier as well as a mobile communication device configured to perform the method according to the invention. A mobile communication device is to be understood more particularly as including a mobile phone or a Smartphone or a tablet PC (PC—Personal Computer).

In connection with the setting parameters of a device of a motor vehicle, for example of an independent vehicle heater, is known to make this process easier by enabling the user can perform the settings on a computer, for example, in his office or mobile via a Smartphone. This is made possible by establishing with the computer a network connection to an Internet server device where the user can authenticate himself to an Internet portal and then set there individual parameters of the functionalities provided by his motor vehicle. For example, he can set the start time for a heating operation of the aforementioned independent vehicle heater. Likewise, parameters such as mileage or fuel level of the motor vehicle can be read out. The parameter values entered by the user on the Internet portal or the requested vehicle data are then exchanged between the server device and the motor vehicle via another network connection. For this purpose, the motor vehicle includes a corresponding communication device, via which the controllers of the motor vehicle can be configured and queried by the server device. The communication device can for this purpose include, for example, a mobile radio module (GPRS, UMTS, LTE) and a router. One example of an Internet portal which enables the vehicle operation via the Internet is the Internet service "myAudi", which is offered by the company Audi AG.

However, configuring a vehicle via the Internet can pose a security risk. An unauthorized person must be prevented from reading data from the vehicle or even from influencing functions of the vehicle. For this reason, a user account must be created in the server device for a user of a vehicle who wants to use the Internet service, and the vehicle must then be registered for the user with the server device, for example via the vehicle identification number (VIN) or generally via other identification data of the vehicle. Finally, to complete this association, a secret code displayed on the Internet portal must be manually entered in the vehicle as proof of ownership.

Another security issue can arise in the context of the use of a mobile communication device in a vehicle. Such mobile communication devices, for example Smartphones, can enable phone calls as well as access to the Internet via the communication device of the vehicle. When using a Smartphone in the vehicle to make phone calls using the hands-free kit, the Smartphone must presently be manually paired once before use via Bluetooth. For secure linking, after searching the Bluetooth device of the vehicle, a Bluetooth PIN (PIN—Personal Identification Number) must be entered and/or confirmed from the Smartphone for authentication. The input may also be required on both sides, i.e. on the side of the Smartphone as well as on the side of the vehicle. If additionally a broadband exchange of data with the Internet with the Smartphone via the vehicle is desired, then according to the prior art, the SSID (Service Set Identifier) of the vehicle Internet access point must be confirmed and for example the WPA2 key (WPA2—Wi-Fi Protected Access 2) must be entered to securely connect the Smartphone to the communication device via a wireless network connection (WLAN—Wireless Local Area Network). Entering the Bluetooth PIN and the encryption WPA2 key is typically done manually and therefore represents a serious impediment for many users, because the menu items to be selected are often hidden deep in the setup menu of the Smartphone and the infotainment system of a vehicle.

If, after purchasing a new or used vehicle, a user wants to activate all the aforementioned functionalities (vehicle configuration via Internet or Smartphone, Bluetooth, WLAN) when the vehicle first enters service, the user must enter at the Internet portal a large number of sometimes extensive access codes either in the vehicle or on his Smartphone or via his PC.

SUMMARY OF THE INVENTION

It is an object of the present invention to make it easier for the user to set up a secure data connection to a vehicle.

The object is attained by a method for entering identification data of a vehicle into a user database of an Internet server by setting up a network connection via the Internet to the server and authenticating a user at an Internet portal of the server; transmitting the identification data via the network connection to the server, wherein the identification data are transmitted by a mobile communication device which is additionally connected to the vehicle by a transmission device configured for transmitting data; receiving the identification data from the vehicle by the communication device via the data transmission device; and storing with the server the identification data as part of user data of the user in the user databas, by a motor vehicle having a display screen and an interface device which is configured to display on the display screen identification data of the motor vehicle as graphic information, by a data carrier on which a program code is stored, whereby when the program code is executed by a mobile communication device, the mobile communication device carries out the part of the aforedescribed method relating to the mobile communication device, and by a mobile communication device, in particular a mobile phone or a Smartphone or a tablet computer, which is configured to carry out the part of a method relating to the mobile communication device. Advantageous embodiments of the method are recited in the dependent claims.

The method according to the invention starts from the premise of entering identification data of a vehicle, such as the chassis number, into a user database of an Internet server device, hereinafter referred to as server in short. As already stated, a network connection via the Internet to the server must be established. A user then authenticates himself at an Internet portal of the server by way of corresponding user data, for example username and password. The identification data of the vehicle will then be transmitted via the network connection to the server and stored by the server in a user database as a part of the user database. From here on, the user's identity and the identity of the vehicle are fixedly correlated in the user database. In order to simplify the entry of the identification data, the method of the present invention now provides to set up the network connection with a mobile communications device which may, for example, include a Smartphone, a mobile phone or a tablet PC. The mobile communication device is additionally coupled to the vehicle via a data transmission device, for example a USB cable (USB—Universal Serial Bus), or exchanges optical information (e.g. taking a picture of a QR-code) or through wireless transmission via a short range radio interface (NFC—Near Field Communication). The identification data are then received by the communication device directly from the vehicle via this data transmission device and can then be transferred to the Internet portal without user intervention. This approach eliminates the need for manual entry of data on the Internet portal by the user. The communication device may be coupled with the vehicle even before a network connection to the server is set up. The identification data are then simply temporarily stored in the communication device.

The invention has the advantage that the user needs to authenticate himself only once at the Internet portal or the Smartphone, for example with username and password, activate the functionality "vehicle configuration via the Internet". All other secret codes can then be automatically transmitted from the vehicle to the server via the transmission device and the network connection. The only additional effort for the user is to enter the vehicle only once with his mobile communication device as proof of ownership.

Using a USB connection, or generally a cable connection, has hereby the advantage that the transmission is particularly secure from eavesdropping.

According to another embodiment of the method, in addition to or instead of the cable connection, the transmission device enables the identification data to be displayed by the vehicle as graphic information on a screen of the vehicle. In particular, the identification data are hereby provided as a 2D bar code or QR code (QR—Quick Response). This embodiment is based on the realization that practically all Smartphones and many other communication devices have a camera which is ideally suited to read—in conjunction with an appropriate program—a 2D-barcode or a QR code and to further use the data contained therein on the communication device. Accordingly, in the embodiment of the method, the graphic information is captured by a camera of the mobile communication device and the identification data contained therein are extracted. The use of graphic information has the advantage that a user need not keep additional cables on hand and plug them in. In addition, this mode of transmission is very secure because the graphic information is usually readable by a camera only a short distance out, so that, for example, such a code cannot be read from outside the vehicle through a vehicle window. The use of QR codes has the particular advantage that a QR code dynamically generated in the vehicle and displayed on the screen can contain several secret codes for simultaneously linking the communication device with different interfaces, i.e. in particular the identification data of the vehicle for the entry into the user database of the server and at the same time a Bluetooth PIN and/or a wireless key (e.g. WPA2).

Unauthorized reading of data may be possible if the transmission device, via which the vehicle exchanges data with the mobile communication device, is based on a wireless connection technology. For example, a potentially used wireless connection can be intercepted by third parties. It may then happen that an unauthorized person reads the identification data of the vehicle via such a wireless connection technology and enter these identification data into his own user account of the server. That person would then be able to always track the operating data of the vehicle or even adjust equipment of the vehicle. In conjunction with the use of a wireless connection technology as the transmission device, an embodiment of the method according to the invention therefore proposes to use an NFC connection (NFC—Near Field Communication) and/or a RFID connection (RFID—Radio-frequency Identification). These connection technologies have relatively short ranges, thus making unauthorized reading or even triggering a transmission process through which the vehicle reveals its identification data more difficult for people outside the vehicle.

According to another embodiment of the method according to the invention, the identification data may additionally be transmitted by the vehicle directly to the server via another network connection. The server then stores the identification data in the user database in the manner described above only if the identification data from the mobile communications device, on the one hand, and from the vehicle, on the other hand, match. This advantageously prevents entry of identification data independent of the vehicle. An unauthorized person would then not be permitted to enter in his own account arbitrary identifying data via the Internet portal. The user must always have sufficient control over the respective vehicle, so that this vehicle automatically transmits the identification data to the server.

As already mentioned, reading of the identification data by unauthorized persons must also be prevented directly at the vehicle itself. To this end, according to another embodiment of the method, the identification data are outputted by the vehicle via the transmission device only, if the user actuates a trigger device installed in the vehicle, i.e. selects a corresponding function in a menu of an infotainment system. When the trigger device is operated, a linking phase having a predetermined time period starts, during which the vehicle indicates the identification data on a screen, for example in the form of a bar code. After completion of the linking phase, the display is deleted.

According to another embodiment of the method, the vehicle outputs its identification data via the transmission device only when an authorized vehicle key of the vehicle is detected by the vehicle. Such a vehicle key may be in form of, for example, a key inserted into a corresponding ignition lock of the vehicle or an identification chip of a keyless-go system.

According to an embodiment of the method, eavesdropping on the identification data during transmission via the transmission device is prevented by having the vehicle encrypt the data to be transmitted by the transmission device before the transmission.

So far, it has only been described how the identification data of the vehicle can be securely and easily entered in the user database of the server by using the method according to the invention. Preferably, however, with the method of the invention, linking information is transmitted by the server to the vehicle (e.g., a PIN or a certificate for data encryption). The vehicle then automatically sets up a data connection to the server and/or to the mobile communication device, and authenticates this data connection based on this linking information. In this way, operating information for the user, such as a current state of charge of the battery or a message relating to the expiration of a service interval of the vehicle, can advantageously be stored on the server by using a control device of the vehicle. In this case, the user needs not be logged in the Internet portal, nor does he need to set up the connection to the vehicle on his own accord on his mobile communication device. The linking information indicates to the receiving device that the user consents to storing this information by using a control device of the vehicle.

According to another embodiment of the method, the mobile communication device may transmit a mobile device number to the server. A mobile radio connection to the mobile communication device can then be set up by the vehicle manufacturer. The user can thus be contacted, for example, via SMS messages (SMS—Short Message Service) or calls from a call center.

According to another embodiment of the method according to the invention, an additional communication key may be transmitted by the vehicle via the data transmission device, in particular a Bluetooth-key and/or a wireless key. This of course assumes that this data transmission device is realized with another connection technology than the communication technology, for which the communication key is to be used (so-called "out-of-band transmission"). After the communication key has been exchanged, the user can then very easily use a hands-free system of the vehicle or even the Internet access provided by the vehicle. By transmitting the communication key automatically, the user is advantageously relieved of the burden to manually enter the corresponding security codes for a Bluetooth connection or a wireless connection, for example by way of the aforementioned Bluetooth PIN and the WPA2 key.

According to one embodiment of the method, in order to be able to easily check whether the corresponding connections were successfully set up, a predetermined set of test data may be exchanged between the communication device and the vehicle via a wireless connection or a Bluetooth connection, and the exchanged data set may then be checked as to whether it is corrupted. According to a preferred embodiment, an audio file may be transmitted for the connection test, which is then played by the receiving device, for example with an announcement like: "The link has been set up successfully."

As already mentioned, the invention also relates to several devices. The motor vehicle according to the invention has a screen and an interface device. The interface device may, for example, be an infotainment system or another type of man-machine interface. The interface device is hereby configured to display identification data of the motor vehicle as graphic information on the screen, in particular a bar code or a QR code.

The data carrier according to the invention (especially in a mobile communication device) is characterized in that a program code is stored therein, wherein when the program code is executed by a mobile communication device, this mobile communication device carries out the particular part of an embodiment of the method according to the invention that is to be executed by the mobile communication device. The program code may be, for example, a so-called "app" available from software vendors via the Internet portals. A mobile communication apparatus according to the invention can be realized by installing on a data carrier of a mobile communication device such an "app" or another program code. In other words, the mobile communication device according to the invention is then configured to carry out the relevant part an embodiment of the method according to the invention relating to the mobile communication device.

BRIEF DESCRIPTION OF THE DRAWING

In the following, the invention will explained again in more detail with reference to an actual exemplary embodiment illustrated in the drawing, which shows in:

FIG. 1 a schematic diagram of a motor vehicle with a mobile communication device connected to an Internet facility.

DETAILED DESCRIPTION OF PREFERRED EMBODIMENTS

FIG. 1 shows a schematic diagram of a motor vehicle 10, a mobile communication device 12 and an Internet server facility, or server 14 for short. The motor vehicle 10 may be, for example, a passenger car or a commercial vehicle. The communication device 12 may be, for example, a smart phone, a mobile phone or a tablet PC. The server 14 may be composed of a single computer or of an installation having multiple computers. The server 14 is connected to the Internet 16, i.e. a network connection may be set up from another communication device to the server via the Internet 16.

It will be assumed for this example that the motor vehicle 10 has recently been acquired by an (unillustrated) user and that the user wants to configure the motor vehicle 10 so that he can use an (unillustrated) hands-free system of the motor vehicle 10 from his communication device 12. Furthermore, he desires to configure for the communication device 12 an (unillustrated) communication unit of an infotainment system 18 of the motor vehicle 10 as a router for accessing the Internet 16. In addition, he desires to enter the motor vehicle 10 in a user database 20 of the server 14 as his motor vehicle. Finally, he desires to be able to read operating data of the motor vehicle 10 from the communication device 12 via the server 14. If the motor vehicle 10 is, for example, an electric vehicle, he could then display the state of charge with his communication device 12, control the charger or program the ON-time and temperature for vehicle air conditioning.

To perform the aforedescribed configuration steps, the user must first set up the necessary data connections between the communication device 12, the motor vehicle 10 and the server 14. The user first loads in a step S1 from a program server 22 of the Internet 16 a copy of a program 26, which is stored as access software 26 in a memory 28 of the communication device 12. For mobile access to the Internet 16, the communication device 12 includes a conventional mobile device 30 for transmitting data in a wireless network 32. The wireless network 32 may be, for example, a wide-area network based on at least one of the following known technologies: GPRS, UMTS, LTE.

Using the access software 24, the user authenticates himself in a step S2 via an Internet connection or network connection 34 at the server 14. The network connection may be based, for example, on the TCP/IP protocol (TCP—Transfer Control Protocol, IP—Internet Protocol). The network connection 34 may be an encrypted connection, which can be set up in a known manner with the HTTPS protocol (secure hypertext transfer protocol).

The user enters on the server 14 via the communication unit 12 a username and a password linked to his user account, both of which are transmitted to the server 14 by the access software 24. If the user does not yet have a user account on the server 14, i.e. if there are no data entries in the database 20 for the user, the user can also re-register with the server 14.

After the username and password are verified by the server 12, the access software 24 transmits a unique identifier of the communication device 12 (UUID—Universally Unique Identifier) and optionally the mobile phone number (MSISDN) of the communication device 12 to be then stored in the user database 20 as part of the user data of the user.

For a next configuration step, the user enters the motor vehicle 10 and starts the infotainment system 18 by inserting an authorized vehicle key. A drive authorization system 35 detects the vehicle key as being authorized and unblocks the electronics of the motor vehicle 10 in a known manner. The user then calls up the function "Connect" in an operating menu of the infotainment system 18. Optionally, operating instructions can be displayed as support on a screen 36 of the vehicle 10. By calling the function "Connect", a Bluetooth interface and/or WLAN interface 38 is switched into a connection mode. The connection mode allows in a known manner to set up a connection to the infotainment system 18 from outside the infotainment system 18, for example via a Bluetooth interface and/or WLAN interface 40 of the communication device 12.

Furthermore, in a step S3, the infotainment system 18 sets up an encrypted wireless data connection as a network connection 42 (for example, based on the TCP/IP protocol) to the server 14 via a mobile radio unit 40 and transmits a vehicle identification number (VIN—Vehicle Identification Number) and a public vehicle certificate (VCERT—Vehicle Certificate) to the server means 14. An on-board SIM card (SIM—Subscriber Identity Module) is installed in the mobile unit 40 for this purpose.

In a further step S4a, the infotainment system displays on the screen 36 a dynamically generated 2D barcode (QR Code) 44. This QR-Code may include the following information, which is encrypted with the vehicle certificate and signed:
  the vehicle identification number (VIN)
  a public certificate of the vehicle (VCERT)
  the BT-MAC address (MAC-BT: Bluetooth-Medium Access Control)
  the Bluetooth Secure Simple Pairing PIN (BT-SSP PIN, Bluetooth PIN)
  the WLAN station identification (SSID)
  the WLAN-WPA2-Pre-shared key (WPA2, PSK, WLAN key).

The user takes a picture of the QR-Code 44 with a camera 46 of the communication device 12.

The access software 24 decodes and decrypts the information of the QR barcode 44 and transmits the chassis number and vehicle certificate in a step S5 via the network connection 34 to the server 14. The OR-code 44 may also contain an identification code of the inserted vehicle ignition key (car key ID). This identification code can then also be transmitted by the access software 24 to the server 14.

In a step S6, the access software 24 uses the Bluetooth MAC address and the Bluetooth Secure Simple Pairing PIN to link the Bluetooth interface 40 with the Bluetooth interface 38 of the infotainment system 18. Likewise, the access software 24 uses the WLAN station identification and the WLAN-WPA2 key to link the WLAN interface 40 with the corresponding WLAN interface 38 of the infotainment system 18. Thus, from now on forward, data can be securely exchanged between the communication device 12 and the infotainment system 18 without further authentication.

In a step S7, the server 14 compares the VIN and the VCERT received from the motor vehicle 10 with the VIN and VCERT received from the access software 24. If the vehicle key was also contained in the QR code 44, then the vehicle key can also be transmitted from the vehicle 10 to the server 14 and likewise be used for identification. If the compared data match, the server 14 enters the VIN in the user database 20 for the user account of the user. Furthermore, the server 14 sends a notification with connection information to the motor vehicle 10 via the network connection 42, for example by using the conventional mobile radio push method. This connection information can thereafter be used to set up with the infotainment system 18 a secure connection to the server 14, which can then be immediately associated with the user account. In addition, the connection information can also be used to establish a connection to the communication device 12. The connection information may, for example, be a PIN or a certificate.

In an optional step S8, the access software 24 may also perform a connection test of a WLAN connection 48 by exchanging a test data set with the infotainment system 18 and with a Bluetooth connection 50. For example, a jingle (short audio file) may be transmitted and played, for example audio data with the content: "The link has been set up successfully. Welcome!"

As an alternative to step S4a, in a step S4b, in lieu of the optical identification with a QR-code 44 and a camera 46, an equivalent connection mechanism between the vehicle and the communication device 12 can be implemented via an NFC link or even a cable in a step S4c. The data connection via the cable can be based for example on USB.

The example shows how the aforedescribed complex individual connection steps can be eliminated by the method according to the invention. For this purpose, neither expensive hardware is required in the vehicle, nor must the mobile communication device include special, non-standard hardware. After free access software 24, which may be obtained for example from a data server 22 via the Internet, is installed on the communication device 12 and after registration at the Internet portal of the server 14, only a picture of, for example, the QR code 44 displayed in the vehicle must be taken, whereafter all desired links (WLAN, Bluetooth, vehicle number entry in the user database 20) are performed automatically in a single operation without additional manual inputs.

What is claimed is:

1. A method for entering identification data of a vehicle into a user database of an Internet server, comprising:
  setting up a network connection via the Internet to the server and authenticating a user at an Internet portal of the server,
  transmitting the identification data via the network connection to the server, wherein the identification data are transmitted by a mobile communication device which is additionally connected to the vehicle by a transmission device configured for transmitting data,
  displaying at least the identification data as graphic information on a screen of the vehicle, and capturing the graphic information by a camera of the mobile communications device,
  receiving the identification data from the vehicle by the communication device via the data transmission device,
  storing with the server the identification data as part of user data of the user in the user database,
  additionally transmitting with the vehicle the identification data directly to the server via an additional network connection, and
  storing the identification data on the server only, when the identification data transmitted by the mobile communication device match the identification data transmitted by the vehicle.

2. The method of claim 1, wherein the graphic information comprises a bar code or a QR-code.

3. The method of claim 1, and further connecting the mobile communication device to the vehicle via a cable connection.

4. The method of claim 3, wherein the cable connection is a USB connection.

5. The method of claim 1, wherein the mobile communication device communicates with the vehicle via a wireless connection technology.

6. The method of claim 5, wherein the wireless connection technology comprises at least one of an NFC connection and a RFID connection.

7. The method of claim 1, wherein the vehicle transmits the identification data via the transmission device only during a connection phase, which has a predetermined time duration and is started by the user by operating a triggering device of the vehicle.

8. The method of claim 1, wherein the vehicle transmits the identification data via the transmission device only when an authorized vehicle key of the vehicle is detected by the vehicle.

9. The method of claim 1, wherein the data transmitted by the vehicle via the transmission device are encrypted.

10. The method of claim 1, and further
transmitting by the server connection information to the vehicle,
automatically setting up with the vehicle a data connection to the server or to the mobile communication device, and
authenticating the data connection based on the connection information.

11. The method of claim 1, wherein the mobile communication device transmits a mobile number to the server, thereby enabling a vehicle manufacturer of the vehicle to contact a customer via SMS or a phone call from a call center via the customer's mobile communication device.

12. The method of claim 1, and further additionally transmitting by the vehicle a communication key via the data transmission device.

13. The method of claim 12, wherein the communication key is a Bluetooth-key or a WLAN key.

14. The method of claim 12, and further
exchanging a predetermined test data set by the mobile communication device and the vehicle via a WLAN connection or a Bluetooth connection, and
checking the exchanged test data set, either automatically or by the user, as to whether the exchanged test data set is corrupted.

* * * * *